United States Patent
Park et al.

(10) Patent No.: US 10,491,836 B2
(45) Date of Patent: Nov. 26, 2019

(54) ELECTRONIC DEVICE AND CONTROL METHOD IN WHICH THE RESOLUTION OF A COMBINED OUTPUT IMAGE CAN BE INCREASED WITHOUT DETERIORATION

(71) Applicant: Samsung Electronics Co., Ltd., Suwon-si, Gyeonggi-do (KR)

(72) Inventors: Jae-Hyoung Park, Yongin-si (KR); Jeong-Won Lee, Seongnam-si (KR); Chong-Sam Chung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/483,193

(22) Filed: Apr. 10, 2017

(65) Prior Publication Data

US 2017/0359522 A1    Dec. 14, 2017

(30) Foreign Application Priority Data

Jun. 10, 2016 (KR) ........................ 10-2016-0072188

(51) Int. Cl.
*H04N 5/265* (2006.01)
*G02B 3/00* (2006.01)
(Continued)

(52) U.S. Cl.
CPC ........... *H04N 5/265* (2013.01); *G02B 3/0006* (2013.01); *H04N 5/2356* (2013.01);
(Continued)

(58) Field of Classification Search
CPC .... H04N 5/265; H04N 5/355; H04N 5/23212; H04N 5/23232; H04N 5/2356; H04N 9/69; G02B 3/0006
See application file for complete search history.

(56) References Cited

U.S. PATENT DOCUMENTS 4,301,478 A * 11/1981 Sakane .............. H04N 5/23212
                                                    348/350
8,290,358 B1 * 10/2012 Georgiev ............... G03B 35/10
                                                    396/326

(Continued)

FOREIGN PATENT DOCUMENTS

EP        2 996 326 A1    3/2016
JP        2013-042443 A   2/2013
JP        2014-235184 A   12/2014

*Primary Examiner* — Luong T Nguyen
(74) *Attorney, Agent, or Firm* — Jefferson IP Law, LLP

(57) ABSTRACT

An electronic device and a control method therefor are provided. The electronic device includes a main lens, an image sensor, and at least one processor. When an input for acquiring an image is received, the at least one processor is configured to acquire, from the at least one main lens, a first image including an object by setting the image sensor to a first position corresponding to a first focal point for the object, acquire, from the at least one main lens, a second image including the object by setting the image sensor to a second position corresponding to a second focal point for the object, and combine the acquired first image and the acquired second image to generate a combined image. The first focal point and the second focal point are positions symmetrical to each other with reference to an on-focus position for the object.

10 Claims, 12 Drawing Sheets

(51) Int. Cl.
*H04N 5/355* (2011.01)
*H04N 9/69* (2006.01)
*H04N 5/232* (2006.01)
*H04N 5/235* (2006.01)

(52) U.S. Cl.
CPC ..... *H04N 5/23212* (2013.01); *H04N 5/23232* (2013.01); *H04N 5/355* (2013.01); *H04N 9/69* (2013.01)

(56) References Cited

U.S. PATENT DOCUMENTS

| | | | |
|---|---|---|---|
| 9,591,202 B2* | 3/2017 | Shoda | H04N 5/23212 |
| 2007/0019104 A1* | 1/2007 | Inoue | H04N 5/23212 |
| | | | 348/345 |
| 2008/0277566 A1* | 11/2008 | Utagawa | G02B 7/34 |
| | | | 250/208.1 |
| 2013/0044256 A1* | 2/2013 | Hiasa | H04N 13/0011 |
| | | | 348/360 |
| 2015/0256744 A1 | 9/2015 | Namboodiri et al. | |
| 2015/0264249 A1 | 9/2015 | Shoda et al. | |
| 2015/0264335 A1* | 9/2015 | Park | G02B 3/0006 |
| | | | 348/49 |
| 2015/0350526 A1 | 12/2015 | Toyoda | |
| 2016/0080639 A1* | 3/2016 | Choi | H04N 5/23232 |
| | | | 348/222.1 |
| 2016/0337576 A1* | 11/2016 | Nobayashi | G01C 3/32 |

* cited by examiner

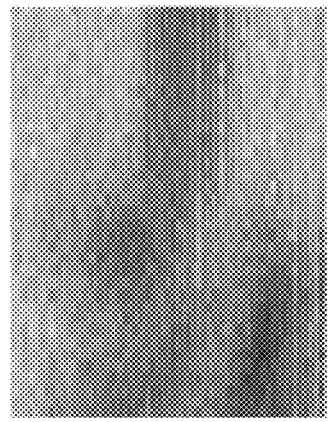 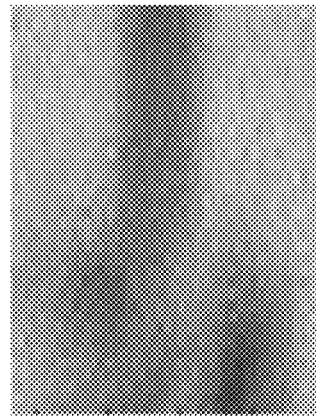
FIG.9A    FIG.9B
 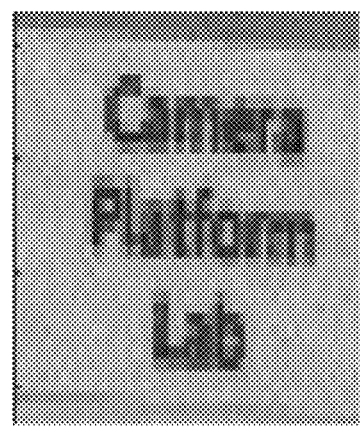
FIG.10A    FIG.10B

ELECTRONIC DEVICE AND CONTROL METHOD IN WHICH THE RESOLUTION OF A COMBINED OUTPUT IMAGE CAN BE INCREASED WITHOUT DETERIORATION

CROSS-REFERENCE TO RELATED APPLICATION(S)

This application claims the benefit under 35 U.S.C. § 119(a) of a Korean patent application filed on Jun. 10, 2016 in the Korean Intellectual Property Office and assigned Serial number 10-2016-0072188, the entire disclosure of which is hereby incorporated by reference.

TECHNICAL FIELD

The present disclosure relates to an electronic device and a control method therefor.

BACKGROUND

An image sensor is an apparatus for converting an optical image into an electrical signal. Generally, an image sensor includes a charge coupled device (CCD) type image sensor and a CMOS type image sensor (CIS). The image sensor has a plurality of pixels, and each pixel may output a pixel signal corresponding to an incident light. Each of the plurality of pixels may accumulate a photo-charge corresponding to an incident light through a photoelectric conversion element (for example, a photodiode), and output a pixel signal based on the accumulated photo-charge.

Recently, in an image acquiring device, an image sensor having a structure in which a plurality of photodiodes is arranged in one micro lens has been widely used. In this type of image sensor, one micro lens constitutes one pixel, and pixels of the same size are generally arranged adjacent to each other.

The above information is presented as background information only to assist with an understanding of the present disclosure. No determination has been made, and no assertion is made, as to whether any of the above might be applicable as prior art with regard to the present disclosure.

SUMMARY

An image output from the image sensor having a structure, in which a plurality of photodiodes is arranged in one micro lens, has a problem in that resolution is reduced as compared with the number of photodiodes because the image is configured in units of micro lenses. Technologies according to the related art for solving this problem, the position of a main lens is changed from an accurate on-focus state to a minimum de-focus state, in order to increase the resolution of an acquired image, and an output image (in other words, a final image) is generated using pixel data acquired at the changed position. That is, the output image may be generated by performing an operation of acquiring an image only at the changed single focus position, and by combining the same with pixel data that is acquired by the plurality of photodiodes and has different phases. In technologies, according to the related art, the focused position and a position having the maximum resolution may be different from each other, and image quality may be different from each region of the image.

Aspects of the present disclosure are to address at least the above-mentioned problems and/or disadvantages and to provide at least the advantages described below. Accordingly, an aspect of the present disclosure is to provide an electronic device for increasing the resolution of the output image by combining images obtained at various positions while generating the output image (or combined image).

An aspect of the present disclosure is to provide a recording medium storing instructions configured to cause at least one processor to perform one or more operations for increasing the resolution of an output image by combining images obtained at various positions while generating the output image.

An aspect of the present disclosure is to provide a control method for an electronic device for increasing the resolution of the output image by combining images obtained at various positions while generating the output image.

In accordance with an aspect of the present disclosure, an electronic device is provided. The electronic devices includes at least one main lens, an image sensor, and at least one processor, wherein, when an input for acquiring an image is received, the at least one processor is configured to acquire, from the at least one main lens, a first image including an object by setting the image sensor to a first position corresponding to a first focal point for the object, acquire, from the at least one main lens, a second image including the object by setting the image sensor to a second position corresponding to a second focal point for the object, and combine the acquired first image and the acquired second image to generate a combined image.

In accordance with an aspect of the present disclosure a computer-readable recording medium is provided. The computer-readable recording medium stores instructions configured to cause at least one processor to perform one or more operations, including operations for receiving an input for acquiring an image, acquiring, from at least one main lens, a first image including an object by setting an image sensor to a first position corresponding to a first focal point for the object, acquiring, from the at least one main lens, a second image including the object by setting the image sensor to a second position corresponding to a second focal point for the object, and combining the acquired first image and second image to generate a combined image.

In accordance with an aspect of the present disclosure a method of controlling an electronic device is provided. The method includes receiving an input for acquiring an image acquiring, from at least one main lens of the electronic device, a first image comprising an object by setting an image sensor to a first position corresponding to a first focal point for the object, acquiring, from the at least one main lens, a second image comprising the object by setting the image sensor to a second position corresponding to a second focal point for the object, and combining the acquired first image and the acquire second image to generate a combined image.

In accordance with an aspect of the present disclosure a method for generating an output image output by an electronic device is provided, such that images acquired from various focal point of the main lens are combined so that the resolution of the output image can be increased without deterioration in a specific image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments the present disclosure will be more apparent from the following description taken in conjunction with the accompanying drawings, in which:

FIGS. 9A, 9B, 10A and 10B are diagrams for comparing an output image according to the related art and a combined image according to various embodiments of the present disclosure;

Throughout the drawings, it should be noted that like reference numbers are used to depict the same or similar elements, features, and structures.

DETAILED DESCRIPTION

Figure 1:
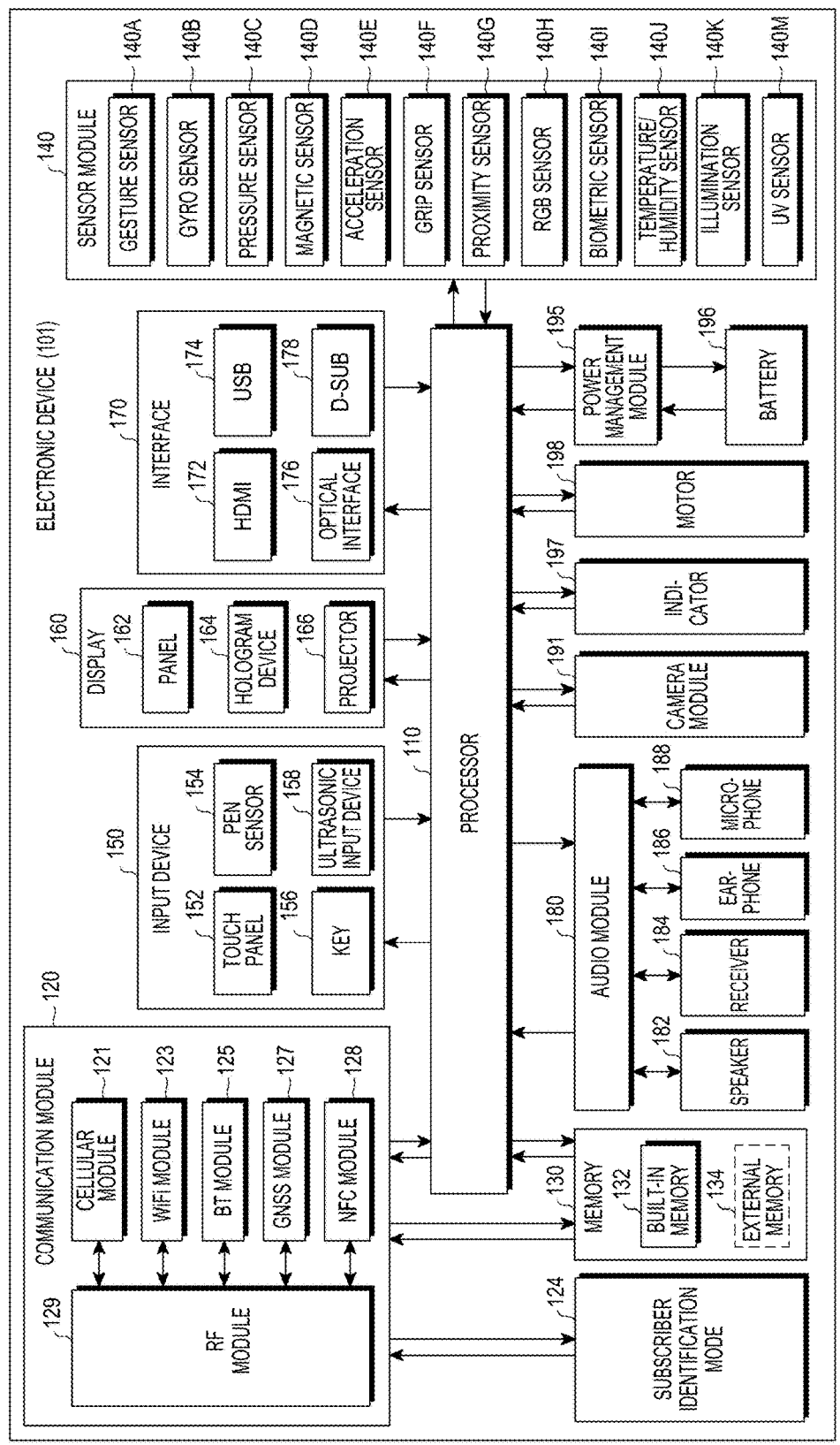
FIG. 1 is a diagram for describing an electronic device according to various embodiments of the present disclosure.

The following description with reference to the accompanying drawings is provided to assist in a comprehensive understanding of various embodiments of the present disclosure as defined by the claims and their equivalents. The present disclosure includes various specific details to assist in that understanding but these are to be regarded as merely exemplary, and not limiting. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting good, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram for describing an electronic device according to various embodiments of the present disclosure.

The electronic device 101 may include at least one application processor (AP) 110, a communication module 120, a subscriber identification module (SIM) card 124, a memory 130, a sensor module 140, an input device 150, a display 160, an interface 170, an audio module 180, a camera module 191, a power management module 195, a battery 196, an indicator 197, and a motor 198.

The processor 110 may drive, for example, an operating system or application programs to control a plurality of hardware or software elements connected thereto and may perform various types of data processing and operations. The processor 110 may be embodied, for example, as a system on chip (SoC). According to an embodiment, the processor 110 may further include a graphic processing unit (GPU) and/or an image signal processor (ISP). The processor 110 may also include at least some (for example, a cellular module 121) of the elements illustrated in FIG. 1. The processor 110 may load, in a volatile memory, instructions or data received from at least one of the other elements (for example, a non-volatile memory) to process the loaded instructions or data, and may store various types of data in the non-volatile memory.

The communication module 120 may include, for example, a cellular module 121, a Wi-Fi module 123, a Bluetooth (BT) module 125, a global navigation satellite system (GNSS) module 127 (e.g., a GPS module, a Glonass module, a Beidou module, or a Galileo module), a near field communication (NFC) module 128, and a radio frequency (RF) module 129.

The cellular module 121 may provide, for example, a voice call, a video call, a text message service, an Internet service, etc. through a communication network. According to an embodiment, the cellular module 121 may identify and authenticate the electronic device 101 within a communication network using the subscriber identification module 124 (for example, a SIM card). According to an embodiment, the cellular module 121 may perform at least some of the functions that the processor 110 may provide. According to an embodiment, the cellular module 121 may include a communication processor (CP).

The Wi-Fi module 123, the BT module 125, the GNSS module 127, or the NFC module 128 may include, for example, a processor for processing data that is transmitted and received through the corresponding module. According to some embodiments, at least some (two or more) of the cellular module 121, the Wi-Fi module 123, the Bluetooth (BT) module 125, the GNSS module 127, and the NFC module 128 may be included in one integrated chip (IC) or IC package.

The RF module 129, for example, may transmit/receive a communication signal (for example, an RF signal). The RF module 129 may include, for example, a transceiver, a power amplifier module (PAM), a frequency filter, a low noise amplifier (LNA), an antenna, etc. According to another embodiment, at least one of the cellular module 121, the Wi-Fi module 123, the BT module 125, the GNSS module 127, and the NFC module 128 may transmit/receive an RF signal through a separate RF module.

The subscriber identification module (SIM) 124 may include, for example, a card that includes a subscriber identity module and/or an embedded SIM, and may contain unique identification information (e.g., an integrated circuit card identifier (ICCID)) or subscriber information (e.g., an international mobile subscriber identity (IMSI)).

The memory 130 may include, for example, an internal memory 132 or an external memory 134. The internal memory 132 may include, for example, at least one of a volatile memory (e.g., a dynamic random access memory (DRAM), a static RAM (SRAM), a synchronous dynamic RAM (SDRAM), etc.) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), etc.).

The external memory 134 may further include a flash drive, for example, a compact flash (CF), a secure digital (SD), a micro-secure digital (Micro-SD), a mini-secure digital (Mini-SD), an extreme digital (xD), a multi-media card (MMC), a memory stick, or the like. The external memory 134 may be functionally and/or physically connected to the electronic device 101 through various interfaces.

The sensor module 140 may, for example, measure a physical quantity or detect the operating state of the electronic device 101 and may convert the measured or detected information into an electrical signal. The sensor module 140 may include, for example, at least one of a gesture sensor 140A, a gyro sensor 140B, an atmospheric pressure sensor 140C, a magnetic sensor 140D, an acceleration sensor 140E, a grip sensor 140F, a proximity sensor 140G, a color sensor 140H (e.g., a red, green, and blue (RGB) sensor), a biometric sensor 140I, a temperature/humidity sensor 140J, an illumination sensor 140K, and an ultra-violet (UV) sensor 140M. Additionally or alternatively, the sensor module 140 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 140 may further include a control circuit for controlling one or more sensors included therein. In some embodiments, the electronic device 101 may further include a processor configured to control the sensor module 140 as a part of, or separately from, the processor 110, and may control the sensor module 140 while the processor 110 is in a sleep state.

The input device 150 may include, for example, a touch panel 152, a (digital) pen sensor 154, a key 156, or an ultrasonic input device 158. The touch panel 152 may use, for example, at least one of a capacitive type, a resistive type, an infrared (IR) type, and an ultrasonic type. Furthermore, the touch panel 152 may further include a control circuit. The touch panel 152 may further include a tactile layer to provide a tactile reaction to a user.

The (digital) pen sensor 154 may include, for example, a recognition sheet that is a part of, or separate from, the touch panel. The key 156 may include, for example, a physical button, an optical key, or a keypad. The ultrasonic input device 158 may detect ultrasonic waves, which are generated by an input tool, through a microphone (for example, a microphone 188) to identify data corresponding to the detected ultrasonic waves.

The display 160 may include a panel 162, a hologram device 164, or a projector 166. The panel 162 may be implemented to be, for example, flexible, transparent, or wearable. The panel 162, together with the touch panel 152, may be implemented as one module. The hologram device 164 may show a three-dimensional image in the air by using an interference of light. The projector 166 may display an image by projecting light onto a screen. The screen may be located, for example, in the interior of, or on the exterior of, the electronic device 101. According to an embodiment, the display 160 may further include a control circuit for controlling the panel 162, the hologram device 164, or the projector 166. The display 160 may display various images according to various embodiment s of the present disclosure.

The interface 170 may include, for example, a high-definition multimedia interface (HDMI) 172, a universal serial bus (USB) 174, an optical interface 176, or a D-sub-miniature (D-sub) 178. The interface 170 may include, for example, a mobile high-definition link (MHL) interface, a secure digital (SD) card/multi-media card (MMC) interface, or an infrared data association (IrDA) standard interface.

The audio module 180 may convert, for example, a sound into an electrical signal, and vice versa. The audio module 180 may process sound information that is input or output through, for example, a speaker 182, a receiver 184, earphones or earphone 186, the microphone 188, etc.

The camera module 191 is a device that can photograph a still image and a moving image. According to an embodiment, the camera module 191 may include one or more image sensors (for example, a front sensor or a rear sensor), a lens, an image signal processor (ISP), or a flash (for example, a light emitting diode (LED) or xenon lamp).

The power management module 195 may manage, for example, the power of the electronic device 101. According to an embodiment, the power management module 195 may include a power management integrated circuit (PMIC), a charger integrated circuit (IC), or a battery or fuel gauge. The PMIC may use a wired and/or wireless charging method. Examples of the wireless charging method may include a magnetic resonance method, a magnetic induction method, an electromagnetic wave method, etc. Additional circuits (for example, a coil loop, a resonance circuit, a rectifier, etc.) for wireless charging may be further included. The battery gauge may measure, for example, the residual amount of the battery 196 and a voltage, current, or temperature while charging. The battery 196 may include, for example, a rechargeable battery and/or a solar battery.

The indicator 197 may indicate a particular state (for example, a booting state, a message state, a charging state, and the like) of the electronic device 101 or a part (for example, the processor 110) thereof. The motor 198 may convert an electrical signal into a mechanical vibration and may generate a vibration, a haptic effect, and the like. Although not illustrated, the electronic device 101 may include a processing unit (for example, a GPU) for supporting mobile TV. The processing unit for supporting the mobile TV may process media data according to a standard, such as digital multimedia broadcasting (DMB), digital video broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 2:
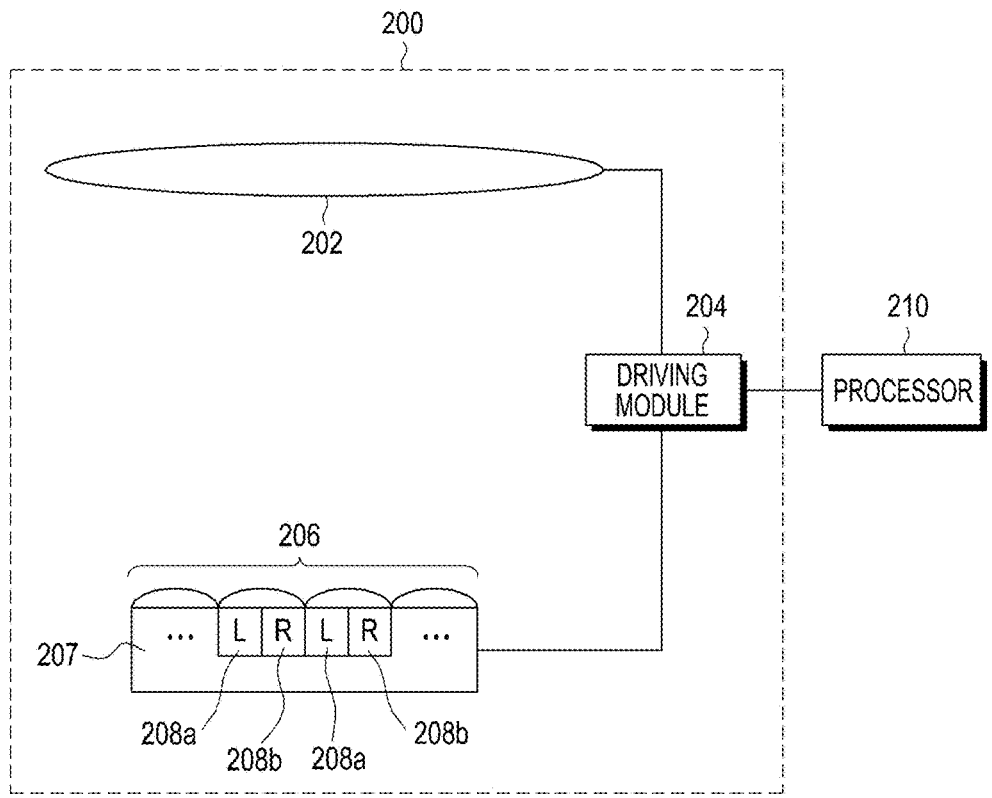
FIG. 2 is a diagram for describing a camera module according to various embodiments of the present disclosure.

FIG. 2 is a diagram for describing a camera module according to various embodiments of the present disclosure.

A camera module 200 according to various embodiments of the present disclosure may include a main lens 202, a driving module 204, a micro lens 206, and photodiodes 208a and 208b. When each micro lens is configured to include two photodiodes, the photodiodes may include a first photodiode 208a and a second photodiode 208b. The photodiodes 208a and 208b may be disposed on a substrate 207. The photodiodes 208a and 208b may constitute at least a part of an image sensor. The driving module 204 may be electrically connected to a processor 210 (e.g., at least one processor). The processor 210 may transmit, to the driving module 204, an electrical signal for controlling the driving module 204. The driving module 204 may adjust (control) the position of the main lens 202 using the received electrical signal. The driving module 204 may include, for example, an actuator. At least some of various components shown in FIG. 2 may be configured separately from the camera module 200.

Figure 3A:
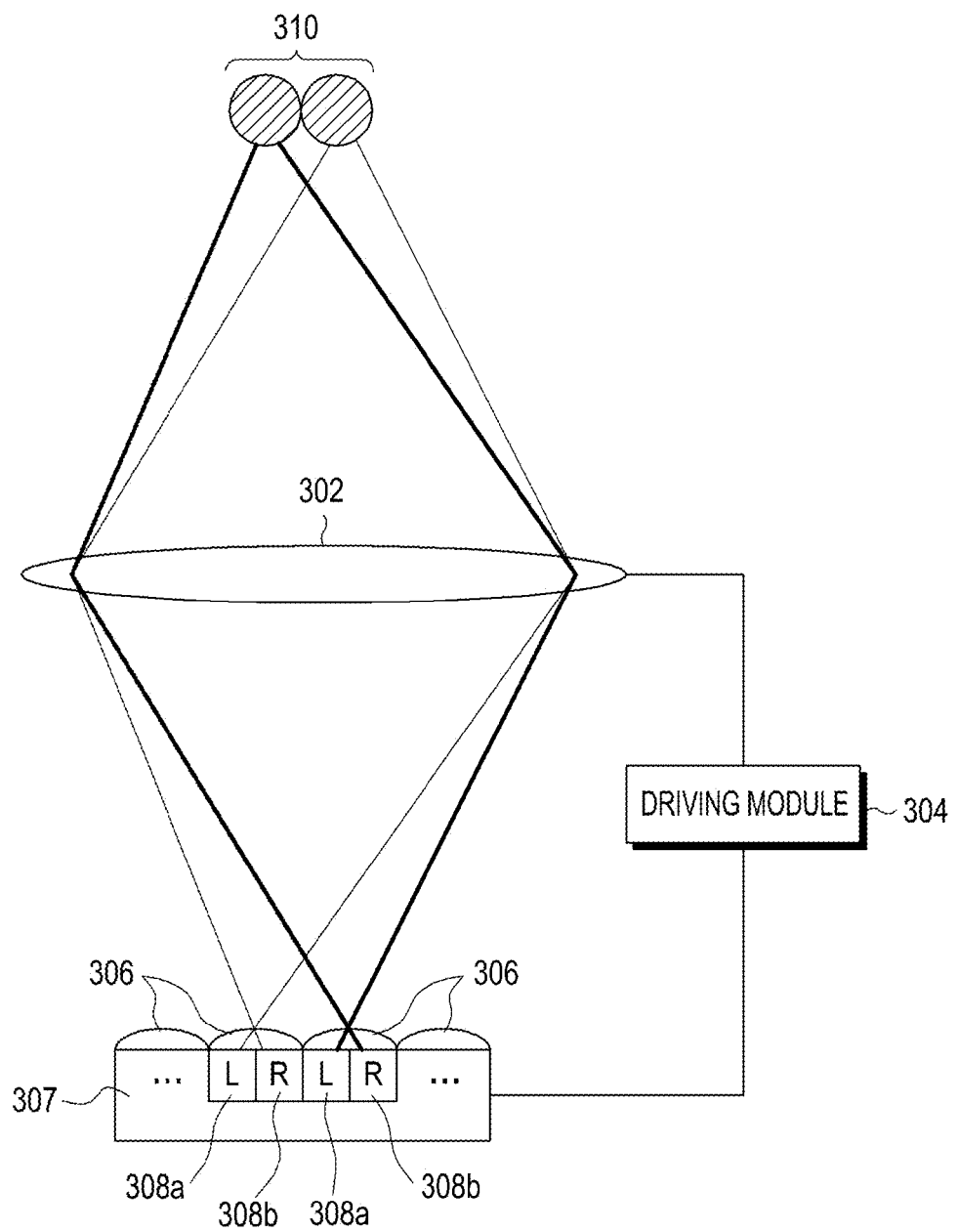
FIG. 3A and FIG. 3B are diagrams for describing an on-focus state and a defocus state according to various embodiments of the present disclosure.
Figure 3B:
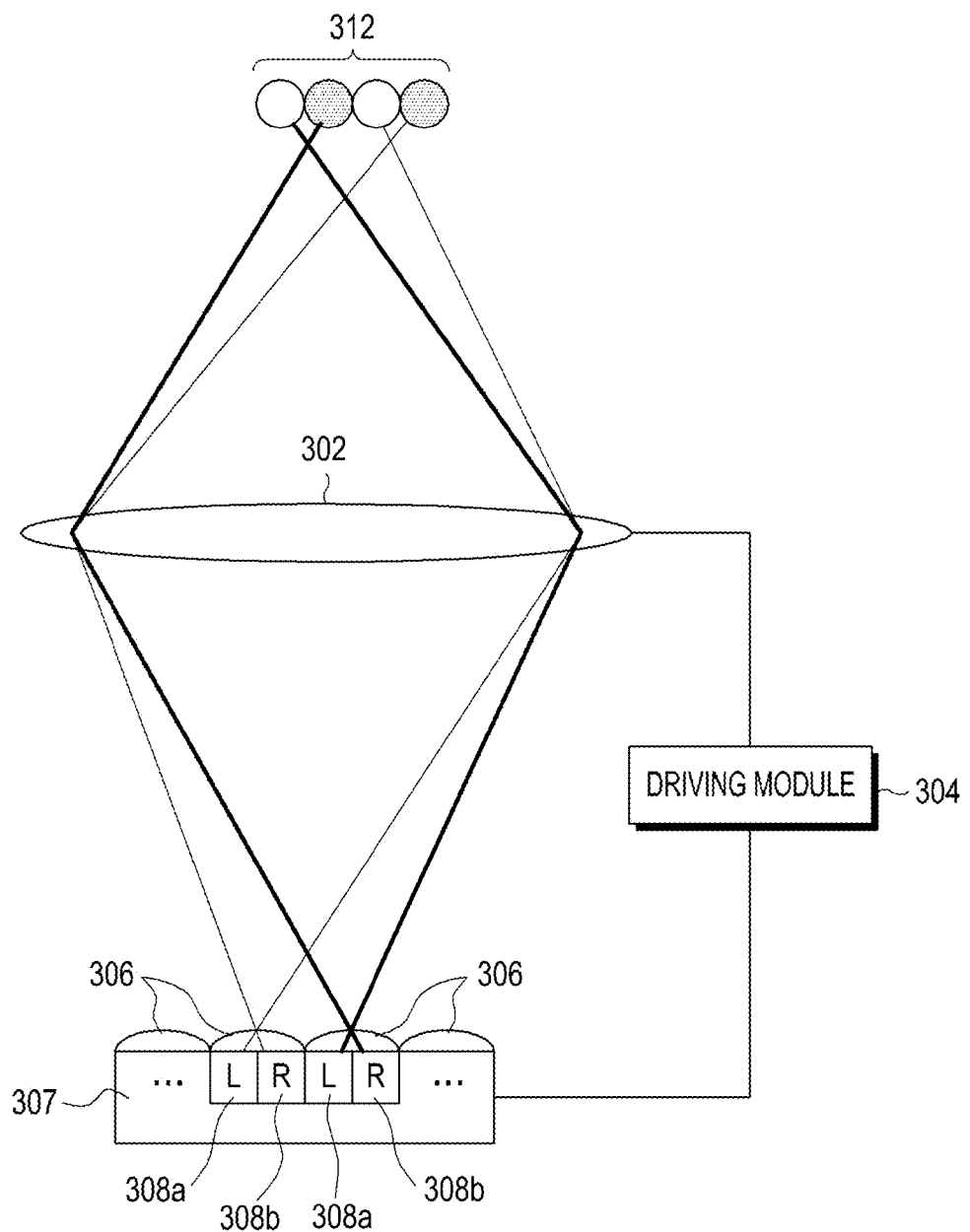

FIG. 3A and FIG. 3B are diagrams for describing an on-focus state and a defocus state according to various embodiments of the present disclosure. FIG. 3A illustrates a path of light in an on-focus state, and FIG. 3B illustrates a path of light in a defocus state. The term "on focus" in the present disclosure may refer to a case where pixel disparity is zero when acquiring an image for a particular object, and the term "defocus" may refer to a case where the pixel disparity is not zero.

Referring to FIG. 3A, photodiodes 308a and 308b according to various embodiments of the present disclosure may receive light reflected from an object 310. The light may be received through a main lens 302 and a micro lens 306. In an on-focus state as shown in FIG. 3A, the first photodiode 308a and second photodiode 30b corresponding to one micro lens 306 may receive light reflected from the same object 310. The photodiodes 308a and 308b may be disposed on a substrate 307.

Referring to FIG. 3B, in a defocus state, the first photodiode 308a and second photodiode 30b corresponding to one micro lens 306 may receive light reflected from different objects 312. As described above, the main lens 302 may be connected to a driving module 304.

Figure 4:
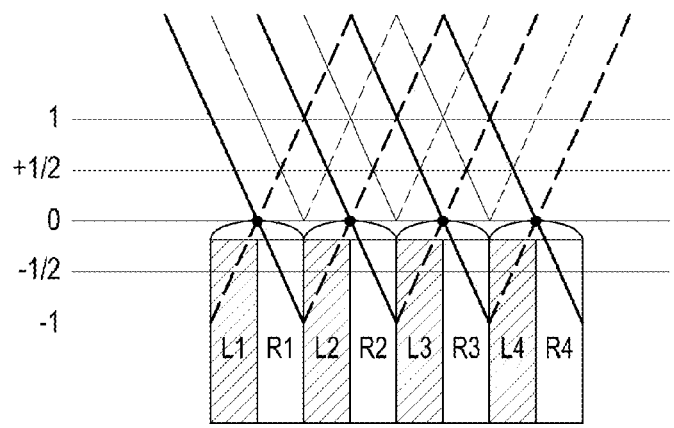
FIG. 4 is a diagram for describing an operation of receiving light by a photodiode in an on-focus state according to various embodiments of the present disclosure.

FIG. 4 is a diagram for describing an operation of receiving light by a photodiode in an on-focus state according to various embodiments of the present disclosure.

As described above, in an on-focus state, which is a case where pixel disparity is zero, the focus may be made on the surface of an image sensor as shown in FIG. 4. In such an on-focus state, since light reflected from the same object is received, a phase difference may not be generated for images acquired by each of the photodiodes L (e.g., L1, L2, L3 and L4) and R (e.g., R1, R2, R3 and R4).

Figure 5:
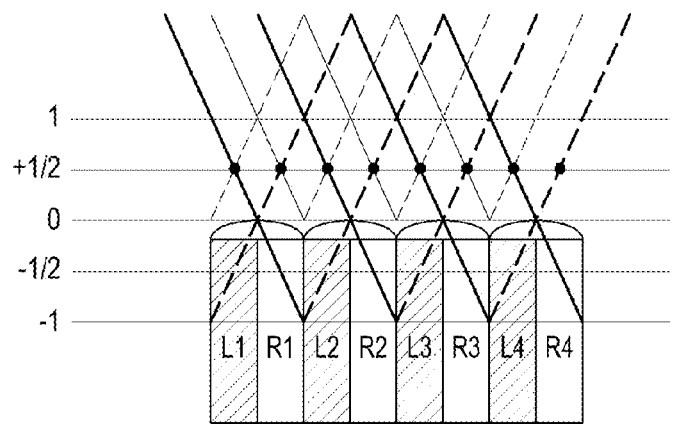
FIG. 5 is a diagram for describing an operation of receiving light in a state where a main lens is moved to a first position according to various embodiments of the present disclosure.

FIG. 5 is a diagram for describing an operation of receiving light in a state where a main lens is moved to a first position according to various embodiments of the present disclosure.

According to various embodiments of the present disclosure, when an input for acquiring an image is received from a user, a processor (e.g., the processor 210) may control a driving module (e.g., the driving module 204) such that the position of a main lens (e.g., the main lens 202) is moved to another position with reference to an on-focus state. The input for acquiring an image may include, for example, a single input through an input device (e.g., the input device 150) or a shutter. FIG. 5 illustrates that a main lens is moved such that the position of the main lens has a focal point moved by a +0.5 pixel distance with respect to the object (in other words, the degree of defocusing), with reference to the focal point in the on-focus state, and becomes a defocused state. The focal point moved by the +0.5 pixel distance may be referred to as a first position in the present disclosure, for convenience of description. The processor may store, in a storage module, data (in other words, pixel data for the first image) acquired by the main lens at the first position. The degree of defocus (N, e.g., 0.5 pixels) according to various embodiments of the present disclosure may be determined by the processor according to Equation 1 as follows.

$$N = +(1-(1/A)), -(1-(1/A)) \qquad \text{Equation 1}$$

In Equation 1, A may denote the number of photodiodes (for example, two) corresponding to one micro lens.

The processor may control the driving module based on Equation 2 as follows in order to change the focal point (in other words, imaging plane) according to the determined degree of defocus (e.g., +0.5 pixels and −0.5 pixels).

$$K*d \qquad \text{Equation 2}$$

In Equation 2, K may denote a scaling constant depending on the distance of movement of an actuator and the degree of defocus, and d may denote the degree of defocus. Through Equation 2, a distance for changing a focal point according to the degree of the defocus may be calculated based on the position of at least one main lens in an on-focus state. The K value may be a predetermined constant. Since the processor may include information on a current position Zc of the driving module and on a position Zp of the driving module in an on-focus state, the processor may control the driving module using the result calculated according to Equation 2 such that the main lens is moved to a position (e.g., the first position and/or the second position) at which a particular focal point is located for the object.

The first image may include a first pixel array (i.e., a pixel array corresponding to light represented by thick dotted lines in FIG. 5) acquired by a first photodiode (e.g., photodiodes L1, L2, L3, and L4), and a second pixel array (i.e., a pixel array corresponding to light represented by thick solid lines in FIG. 5) acquired by a second photodiode (e.g., photodiodes R1, R2, R3, and R4). The phase of an image based on the first pixel array of the first image and the phase of an image based on the second pixel array of the same may be different from each other.

According to various embodiments of the present disclosure, in addition to an embodiment determined by Equation 1 which is a case where the degree of defocus is determined, the degree of defocus may be determined according to "f-number" of the main lens. For example, since a circle of confusion may become larger when f-number is small, according to various embodiments of the present disclosure, when the f-number of the main lens becomes smaller, the focal point being moved may be moved to a position smaller than 0.5 pixels (e.g., 0.2 pixels). According to various embodiments of the present disclosure, the degree of movement of the main lens (e.g., the distance of 0.5 pixels, etc.) corresponding to the focal point may be stored in advance in a storage module. The processor may control the driving module such that the position of the main lens is moved based on information on the amount of movement stored in the storage module. Alternatively, according to various embodiments of the present disclosure, the processor may control the driving module such that the position of the main lens is adjusted according to an arbitrary distance value (e.g., 0.3 pixels) included in a range of distance (e.g., 0 pixels to 0.5 pixels) corresponding to a particular focal point. That is, the focal point (+0.5 pixels, −0.5 pixels) is illustratively referred for the description of the present disclosure, and the focal point may be changed into various values and implemented according to various embodiments.

Figure 6:
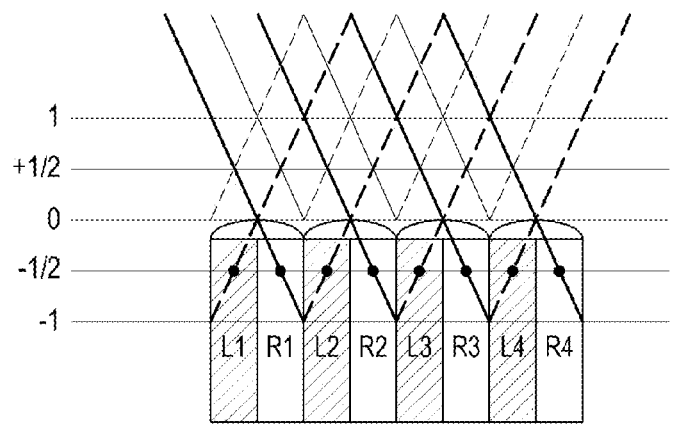
FIG. 6 is a diagram for describing an operation of receiving light in a state where a main lens is moved to a second position according to various embodiments of the present disclosure.

FIG. 6 is a diagram for describing an operation of receiving light by a main lens in a state where the main lens is moved to a second position according to various embodiments of the present disclosure.

Referring to FIG. 6, the processor may control the driving module in order to move the main lens so that the focal point for the object is at a second focal point (e.g., −0.5 pixels), after acquiring the first image. The focal point moved by the −0.5 pixels distance may be referred to as a term to be referred to as the second position in the present disclosure for convenience of description. The processor may store, in a storage module, data acquired in a state where the main lens is moved to a second position (in other words, pixel data for the second image). The second image may include a first pixel array (a pixel array corresponding to light represented by thick dotted line of FIG. 6) acquired by a first photodiode (e.g., photodiodes L1, L2, L3, and L4) and a second pixel array (a pixel array corresponding to light represented by thick solid lines of FIG. 6) acquired by a second photodiode (e.g., photodiodes R1, R2, R3, and R4). The phase of an image based on the first pixel array of the second image and the phase of the image based on the second pixel array of the same may be different from each other.

Figure 7:
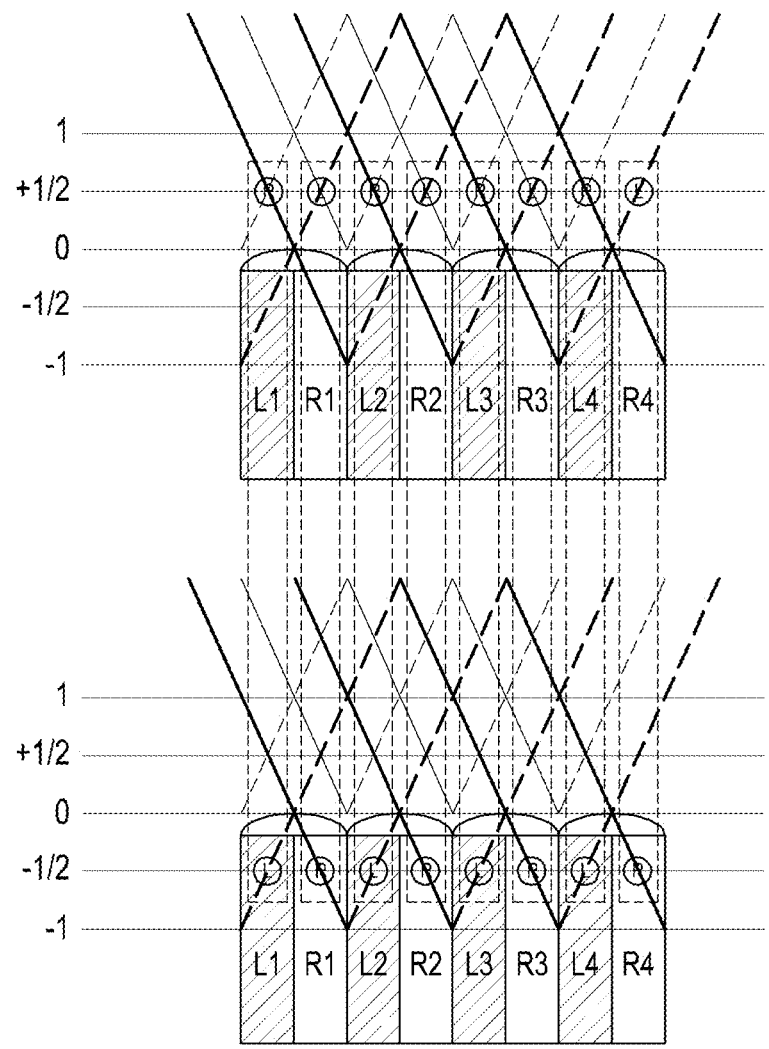
FIG. 7 is a diagram for describing a function or operation of generating a combined image according to various embodiments of the present disclosure.

FIG. 7 is a diagram for describing a function or operation of generating a combined image according to various embodiments of the present disclosure.

A processor (e.g., the processor 210) according to various embodiments of the present disclosure may combine the first image and the second image to generate a combined image.

The processor may calculate, for example, referring to FIG. 7, the average value of the sum of a pixel value corresponding to a second pixel array of the first image and a pixel value corresponding to a first pixel array of the second image (for example, in FIG. 7, ½ (a pixel value corresponding to a photodiode R1 of a first image (or first position)+a pixel value corresponding to a photodiode L1 of a second image (or second position)), and the average value of the sum of a pixel value corresponding to a first pixel array of the first image and a pixel value corresponding to a second pixel array of the second image (for example, in FIG. 7, ½ (a pixel value corresponding to a photodiode L1 of a first image (or first position)+a pixel value corresponding to a photodiode R1 of a second image (or second position)), and determine the calculated value as the pixel value of a combined image to generate the combined image. According to various embodiments of the present disclosure, one micro lens may correspond to one pixel.

According to various embodiments of the present disclosure, the processor may generate the combined image using a value obtained by applying gamma correction to the average value. The gamma correction may be performed according to a predetermined gamma value. According to various embodiments of the present disclosure, the combined image may be generated using the sum of the pixel values (i.e., not the average value of the sum of the pixel values).

The phase of an image based on a second pixel array of the first image and the phase of an image based on a first pixel array of the second image may be identical to each other, or the phase of an image based on a first pixel array of the second image and the phase of an image based on a second pixel array of the first image may be identical to each other. Since the focal points of the first image and the second image are different from each other, a difference in angle of view with respect to the object may occur according to the movement of the main lens. In this case, an image matching process between the two images may be performed by the processor before the combined image is generated. The image matching process may include, for example, a process of matching the image magnifications of the first image and the second image (e.g., 1× or 1.00n× (wherein n is a natural number 1 to 9), etc.) with each other. The process of matching the image magnifications with each other may include the process of matching the magnification of the first image and the magnification of the second image as one predetermined magnification (e.g., 1×), or the process of matching another single image to the magnification of the first image or the magnification of the second image.

Figure 8A:
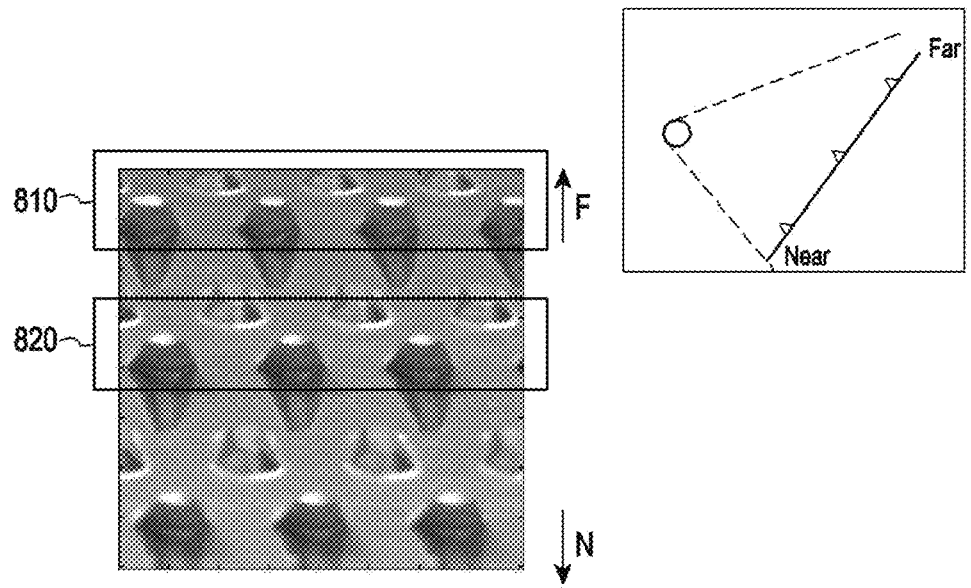
FIG. 8A is a diagram for describing a first image according to various embodiments of the present disclosure.
Figure 8B:
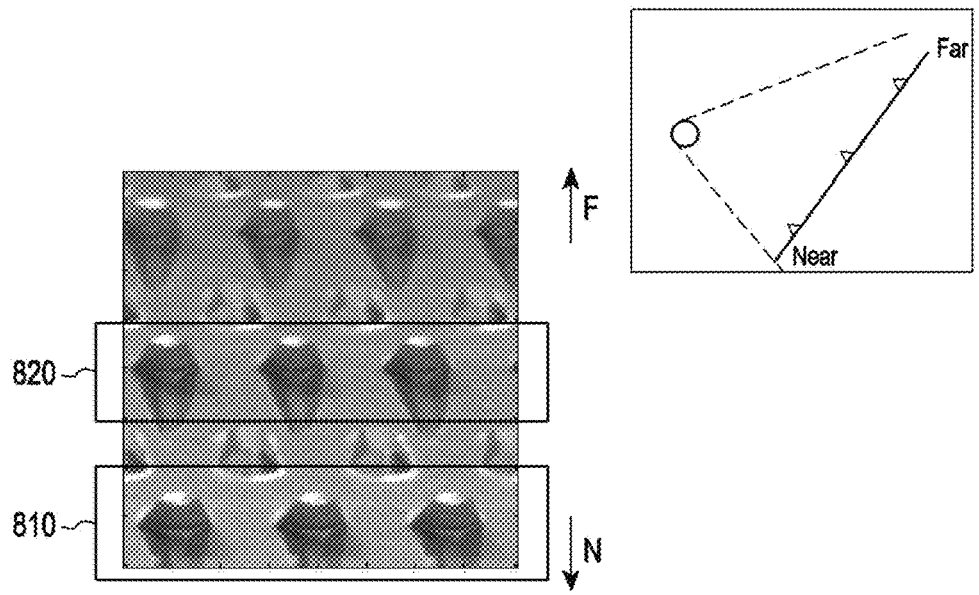
FIG. 8B is a diagram for describing a second image according to various embodiments of the present disclosure.
Figure 8C:
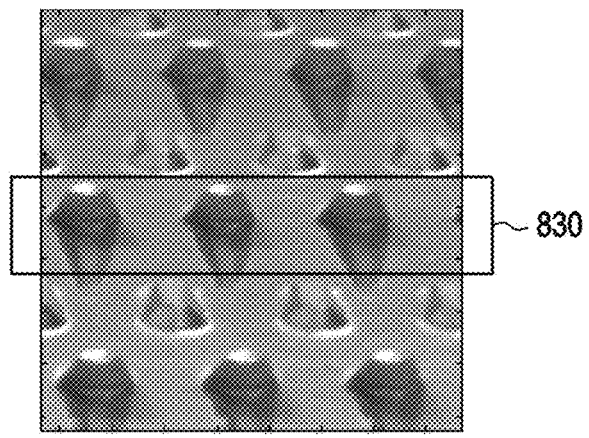
FIG. 8C and FIG. 8D are diagrams for describing a combined image according to various embodiments of the present disclosure.
Figure 8D:
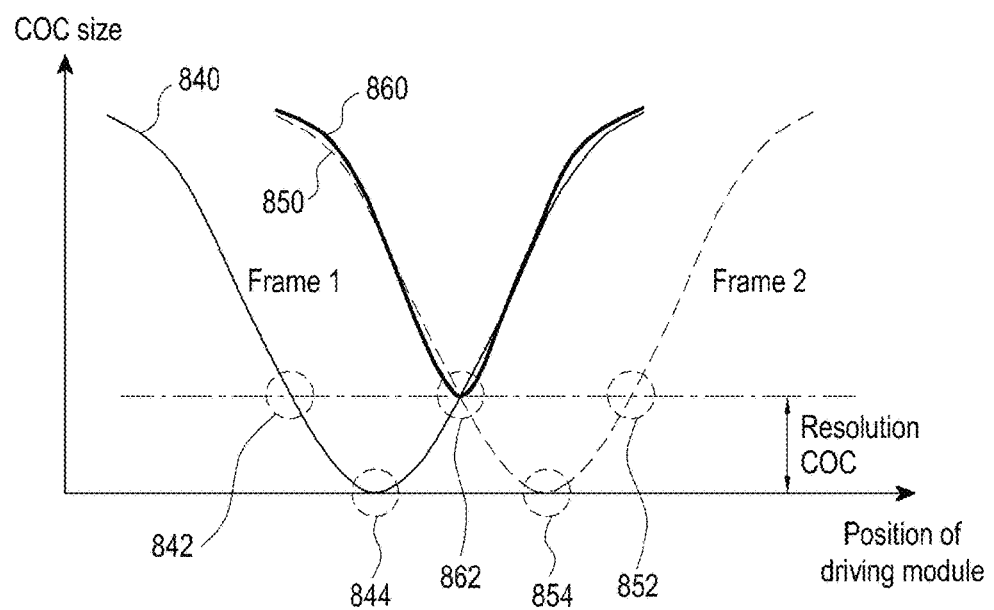

FIG. 8A is a diagram for describing a first image according to various embodiments of the present disclosure. FIG. 8B is a diagram for describing a second image according to various embodiments of the present disclosure. FIG. 8C and FIG. 8D are diagrams for describing a combined image according to various embodiments of the present disclosure.

FIG. 8A illustrates an image (i.e., the first image) acquired at the first position, and FIG. 8B illustrates an image (i.e., the second image) acquired at the second position. As shown in FIG. 8A and FIG. 8B, each image may be different in an on-focus area 810 and an area 820 having the highest resolution. According to various embodiments of the present disclosure, the phase of a pixel acquired by a photodiode R1 and the phase of a pixel acquired by a photodiode L1 may be the same.

The on-focus area 810 for the first image may correspond to a position 844 in FIG. 8D, and the area 820 having the highest resolution may correspond to a position 842 or position 862 in FIG. 8D. The on-focus area 810 for the second image may correspond to a position 854 in FIG. 8D, and the area 820 having the highest resolution may correspond to a position 852 or 862 in FIG. 8D. In FIG. 8D, "COC" may refer to a Circle of Confusion.

Referring to FIG. 8C, when the first image and the second image are combined according to various embodiments of the present disclosure, an on-focused area (e.g., an on-focus area 810) and an area having the highest resolution (e.g., an area 820 having the highest resolution) are matched so as to generate an image having a high resolution. The resulting or matched area 830 may correspond to a position 862 in FIG. 8D. FIG. 8D illustrates Frame 1 (840) and Frame 2 (850) and a matched area or segment 860.

FIGS. 9A, 9B, 10A and 10B are diagrams for comparing an output image technology according to the related art with a combined image according to various embodiments of the present disclosure.

According to the related art, since pixels having different phases are extracted only from one focal point distance to generate an output image, when the phase difference (i.e., the degree of defocus) is defocused to 1 pixel or more, an image indicating a completely different object, for example, a defocused image having a grid pattern as shown in FIG. 9A, may be generated. However, according to various embodiments of the present disclosure, even when the phase difference is defocused to one pixel or more, at least two images acquired at different focal points are combined to generate a combined image, so that an image having no grid pattern may be acquired as shown in FIG. 9B.

In addition, according to the related art, a grid pattern may be included in an output image as shown in FIG. 10A due to the wavelength mismatch depending on the color of an object. However, according to various embodiments of the present disclosure, as shown in FIG. 10B, at least two images acquired at different focal points are combined to generate a combined image, so as to generate (in other words, output) a clear image having no grid pattern.

In addition, according to the related art, the output image is generated by treating each photodiode as one pixel. However, in contrast to the related art, a combined image according to various embodiments of the present disclosure may treat at least two photodiodes (e.g., L1+R1) as one pixel through a function or an operation of combining at least two images acquired at different focal points, so that an image having reduced noise (as compared to the related art) can be output.

Figure 11:
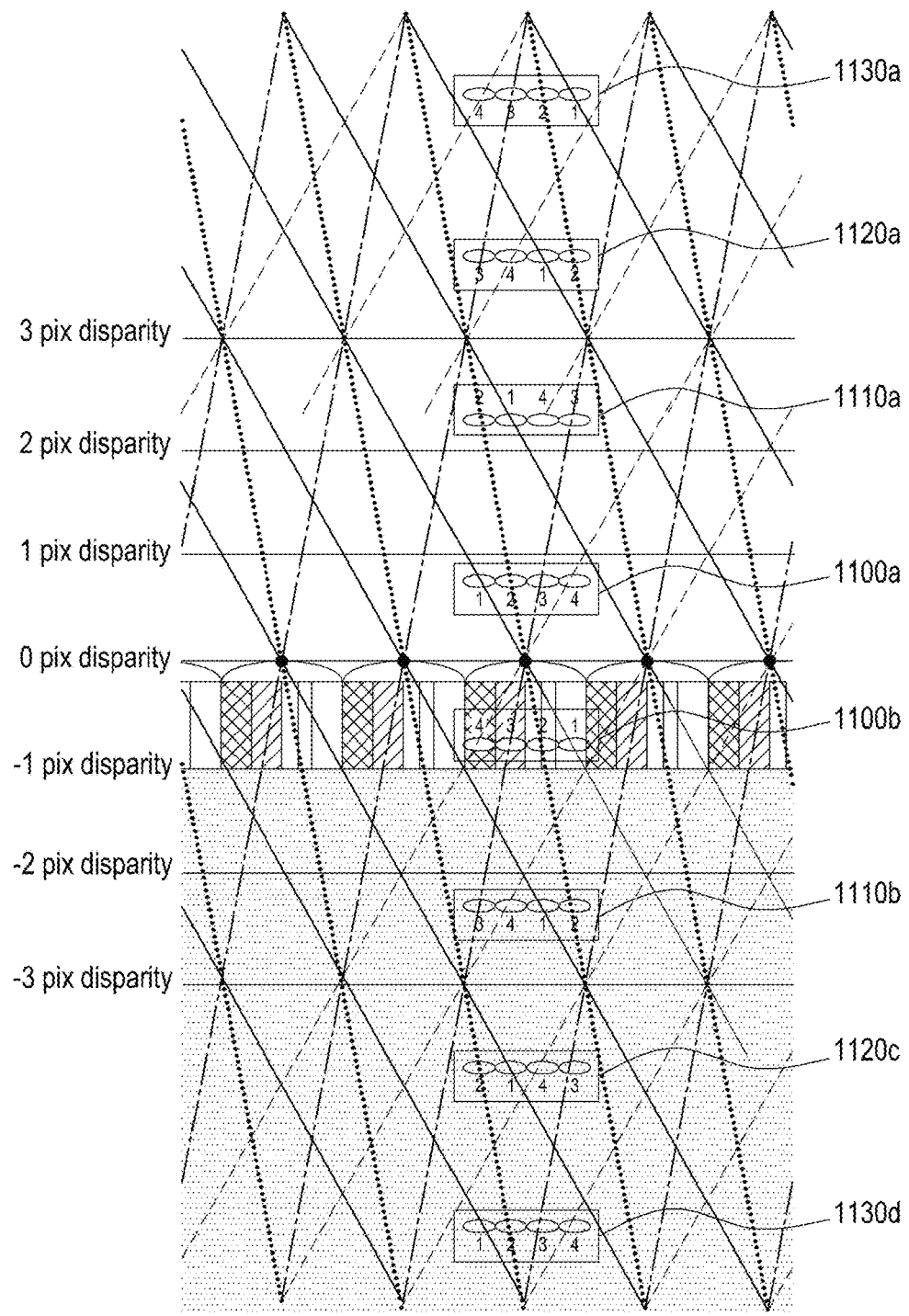
FIG. 11 is a diagram for describing a case to which four photodiodes are applied according to various embodiments of the present disclosure.

FIG. 11 is a diagram for describing a case to which four photodiodes are applied according to various embodiments of the present disclosure.

According to various embodiments of the present disclosure, the number of photodiodes included in the image sensor may be four, for example. In such a case, according to various embodiments of the present disclosure, the position of the main lens is moved with reference to the position of a main lens, which corresponds to an on-focus position (i.e., "0 Pix disparity" in FIG. 11), and an image (e.g., a first image 1100a) acquired at a position where the main lens is moved by a particular distance (e.g., +0.75 pixels) and an image (e.g., a second image 1100b) acquired at a position where the main lens is moved by a particular distance in a negative direction (e.g., −0.75 pixels) may be combined so as to generate the combined image. According to various embodiments of the present disclosure, even when the number of the photodiodes is four, at least one pixel array (e.g., pixel data acquired by photodiode "1", and pixel data acquired by photodiode "4") having the same phase may be included, so that even though two pixel arrays are combined, an image having an improved resolution (as compared to the related art) can be generated. In addition, according to various embodiments of the present disclosure, in order to generate an image having an improved resolution compared to a case where two pixel arrays are combined, the processor may generate the combined image by additionally combining, to the first image 1100a and the second image 1100b, an image (e.g., a third image 1110a) acquired at a position where the main lens is moved by a particular distance (e.g., +2.25 pixels) and an image (e.g., a fourth image 1110b) acquired at a position where the main lens is moved by a particular distance (e.g., −2.25 pixels). When four images are used as described above, a combined image may be generated using all four images having the same phase, so that the resolution of a combined image according to various embodiments of the present disclosure can be improved through such function or operation. That is, according to various embodiments of the present disclosure, when the number of photodiodes is greater than or equal to n (n is a natural number greater than 2), the processor may, in addition to the first position and the second position, obtain an n-th image (e.g., when n=4, obtain a third image and a fourth image) at an n-th position (the position of the main lens) corresponding to an n-th focal point that is different from the first focal point and the second focal point, and may combine the acquired first to n-th images to generate the combined image. Additional acquired images 1120a, 1120c, 1130a and 1130d are illustrated in FIG. 11.

In addition, the description of an electronic device according to the various embodiments of the present disclosure described above may be equally applied to an embodiment illustrated in FIG. 11.

According to various embodiments of the present disclosure, the term of "position of at least one main lens" (e.g., the first position, etc.) may be referred to as a term "distance between a substrate and a main lens" in terms of the distance. In the present disclosure, described are embodiments in which the at least one main lens is moved by the driving module in a state where the substrate is fixed. However, according to various embodiments of the present disclosure, the position of the at least one main lens is fixed, and the position of the substrate may be controlled by the driving module.

Figure 12:
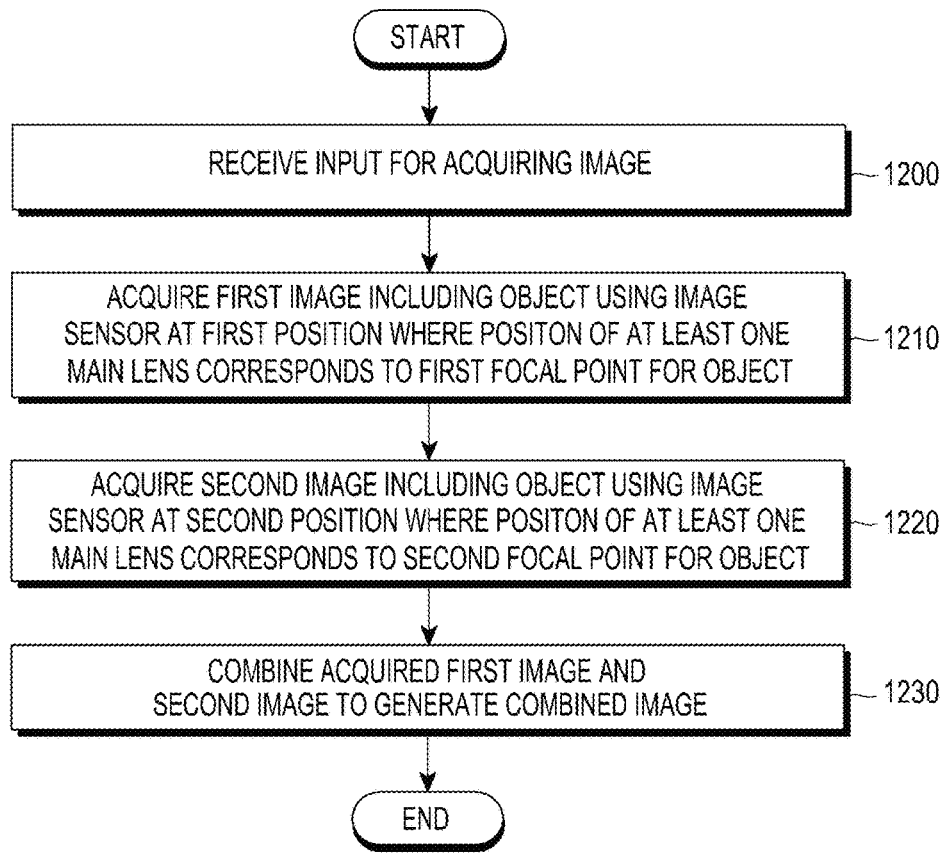
FIG. 12 is a diagram for describing a method of controlling an electronic device according to various embodiments of the present disclosure.

FIG. 12 is a diagram for describing a method for controlling an electronic device according to various embodiments of the present disclosure.

Referring to FIG. 12, a method for controlling an electronic device according to various embodiments of the present disclosure may include a process 1200 of receiving an input for acquiring an image.

A method for controlling an electronic device according to various embodiments of the present disclosure may include a process 1210 of acquiring a first image including an object by using the image sensor at a first position.

A method for controlling an electronic device according to various embodiments of the present disclosure may further include a process 1220 of acquiring a second image including the object by using the image sensor at a second position.

A method for controlling an electronic device according to various embodiments of the present disclosure may further include a process 1230 of combining the acquired first image and second image to generate a combined image.

Further, the description of the electronic device according to various embodiments of the present disclosure may be equally applied to the method of operating the electronic device according to various embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which have been known or are to be developed hereinafter.

At least some of the devices (for example, modules or functions thereof) according to various embodiments and the control methods or the method (for example, operations) for the electronic device according to various embodiments of the present disclosure may be implemented by instructions stored in a computer-readable storage medium in the form of a programming module. The instruction, when executed by a processor (e.g., the processor 110), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read-only memory (CD-ROM) and a digital versatile disc (DVD)), magneto-optical media (e.g., a floptical disk), a hardware device (e.g., a read-only memory (ROM), a random-access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one main lens;
   a plurality of micro lenses, each of the plurality of micro lenses corresponding to a plurality of photodiodes;
   an image sensor; and
   at least one processor,
   wherein, when an input for acquiring an image is received, the at least one processor is configured to:
      acquire, from the at least one main lens, a first image including an object by setting the image sensor to a first position corresponding to a first focal point for the object,
      control to adjust a position of the at least one main lens;
      acquire, from the at least one main lens with the adjusted position, a second image including the object corresponding to a second focal point for the object, and
      generate a combined image of increased resolution, relative to the first image and the second image, by combining the acquired first image and the acquired second image, the acquired first image and the acquired second image being combined based on at least one of a sum of a first pixel value acquired by a first photodiode among the plurality of photodiodes at the first position and a second pixel value acquired by a second photodiode among the plurality of photodiodes at the second position or an average value of the sum of the first pixel value and the second pixel value,
   wherein the first focal point and the second focal point comprise positions symmetrical to each other with reference to an on-focus position for the object, and
   wherein the first focal point and the second focal point are determined based on an inverse number of the plurality of photodiodes which correspond to each of the plurality of micro lenses.

2. The electronic device of claim 1, wherein the first focal point and the second focal point comprise positions defocused by a certain pixel size from an on-focus position for the object.

3. The electronic device of claim 1, wherein the at least one processor is further configured to perform image matching in order to match magnifications of the first image and second image with each other.

4. The electronic device of claim 1,
   wherein, when the number of the plurality of photodiodes is greater than or equal to n (n is a natural number greater than 2), the at least one processor is further configured to:
      acquire, from the at least one main lens, an n-th image for the object at an n-th position corresponding to an n-th focal point that is different from the first focal point and the second focal point, and
      combine the acquired first to n-th images to generate the combined image.

5. The electronic device of claim 1, wherein the input for acquiring the image comprises a single input.

6. A non-transitory computer-readable recording medium storing instructions configured to cause at least one processor to perform one or more operations, the one or more operations comprising:
   receiving an input for acquiring an image;
   acquiring, from at least one main lens, a first image including an object by setting an image sensor to a first position corresponding to a first focal point for the object, the image sensor including a plurality of micro lenses, each of the plurality of micro lenses corresponding to a plurality of photodiodes;
   controlling to adjust a position of the at least one main lens;
   acquiring, from the at least one main lens with the adjusted position, a second image including the object corresponding to a second focal point for the object; and
   generating a combined image of increased resolution, relative to the first image and the second image, by combining the acquired first image and second image, the acquired first image and the acquired second image being combined based on at least one of a sum of a first pixel value acquired by a first photodiode among the plurality of photodiodes at the first position and a second pixel value acquired by a second photodiode among the plurality of photodiodes at the second position or an average value of the sum of the first pixel value and the second pixel value,
   wherein the first focal point and the second focal point comprise positions symmetrical to each other with reference to an on-focus position for the object, and
   wherein the first focal point and the second focal point are determined based on an inverse number of the plurality of photodiodes which correspond to each of the plurality of micro lenses.

7. The non-transitory computer-readable recording medium of claim 6, wherein the first focal point and the second focal point comprise positions defocused by a certain pixel size from an on-focus position for the object.

8. The non-transitory computer-readable recording medium of claim 6, wherein the one or more operations further comprise:
   performing image matching of the first image and second image in order to match magnifications of the acquired first image and the acquired second image with each other.

9. The non-transitory computer-readable recording medium of claim 6, wherein, when the number of the plurality of photodiodes is greater than or equal to n (n is a natural number greater than 2), the one or more operations further comprise:
   acquiring, by the at least one main lens, an n-th image for the object at an n-th position corresponding to an n-th focal point that is different from the first focal point and the second focal point; and combining the acquired first to n-th images to generate the combined image.

10. A method for controlling an electronic device, the method comprising:
- receiving an input for acquiring an image;
- acquiring, from at least one main lens of the electronic device, a first image comprising an object by setting an image sensor to a first position corresponding to a first focal point for the object, the image sensor including a plurality of micro lenses, each of the plurality of micro lenses corresponding to a plurality of photodiodes;
- controlling to adjust a position of the at least one main lens;
- acquiring, from the at least one main lens with the adjusted position, a second image comprising the object corresponding to a second focal point for the object; and
- generating a combined image of increased resolution, relative to the first image and the second image, by combining the acquired first image and the acquired second image, the acquired first image and the acquired second image being combined based on at least one of a sum of a first pixel value acquired by a first photodiode among the plurality of photodiodes at the first position and a second pixel value acquired by a second photodiode among the plurality of photodiodes at the second position or an average value of the sum of the first pixel value and the second pixel value, wherein the first focal point and the second focal point comprise positions symmetrical to each other with reference to an on-focus position for the object, and wherein the first focal point and the second focal point are determined based on an inverse number of the plurality of photodiodes which correspond to each of the plurality of micro lenses.

* * * * *